March 24, 1964 R. SMITH 3,125,823
ANIMAL TRAP
Filed July 3, 1961 2 Sheets-Sheet 1

Russell Smith
INVENTOR.

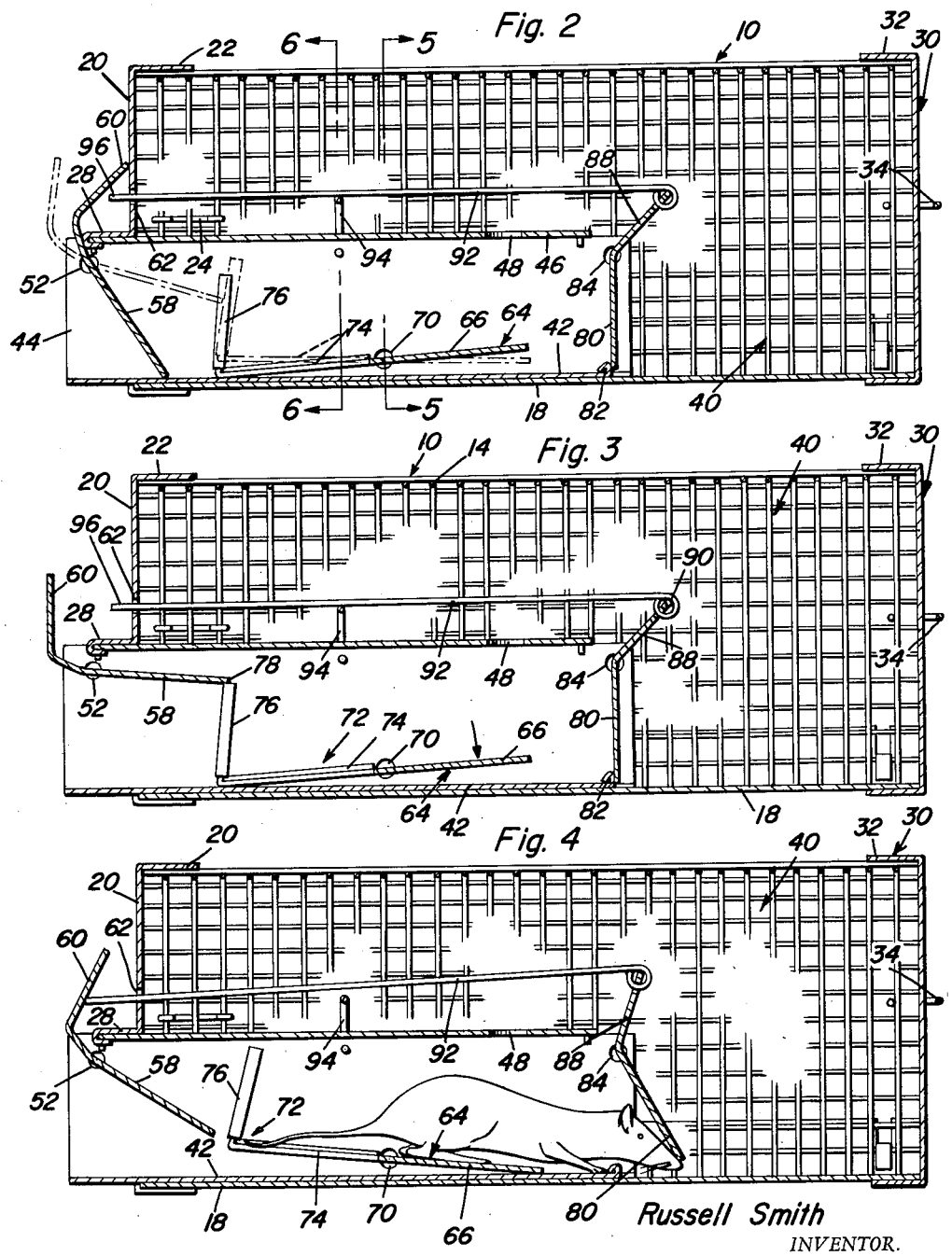

United States Patent Office 3,125,823
Patented Mar. 24, 1964

3,125,823
ANIMAL TRAP
Russell Smith, Gosport, Ind., assignor of thirty percent to John M. King, Gosport, Ind.
Filed July 3, 1961, Ser. No. 121,556
4 Claims. (Cl. 43—76)

The present invention relates to a portable trap suitably designed and constructed to catch and imprison animals, such as for example rats, mice and the like, and has to do with a trap which is characterized by a cage provided with novel animal actuated trap door means.

Briefly the invention is characterized by two units; namely an openwork cage providing a confining space in which a number of trapped animals are imprisoned until drowned or otherwise disposed of by the trapper, and an elongated tunnel-like chute having an inlet end fitting into and projecting outwardly beyond an animal entrance door and having its major portion projecting into the space of the cage. This chute is open-ended and provided at a first end with an animal opened entrance door which is propped up in a ready-to-trap position by means provided therefor on an animal tilted platform in the chute. In addition a second door is provided at the discharge end of the chute emptying into the space of the edge and the second door is also animal responsive and functions to automatically reset the entrance door for a second or next victim.

In carrying out a preferred embodiment of the invention the body of the cage is preferably of suitable woven wire or similar material. The bottom and front and rear ends are preferably of sheet material, the rear end being in the form of a readily applicable and removable closure and having simple mechanical means for latching it in place.

A further improvement resides in the novel construction of the chute particularly the pivoted gravity lowerable trap doors, the animal actuated or tilted platform therebetween and a reset means providing a cooperating association between the doors.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a central longitudinal sectional view on the plane of the section line 2—2 of FIGURE 1 with both trap doors closed and showing in phantom lines the movement of the platform trip and the entrance door;

FIGURE 3 is a view like FIGURE 2 but showing the initial set or open position of the entrance door and closed position of the exit door;

FIGURE 4 is also a view based on the sequence shown in FIGURES 2 and 3 and showing the entrance door in the state of closing and the exit door being pushed open that the animal be allowed to escape into the cage;

Figure 5:
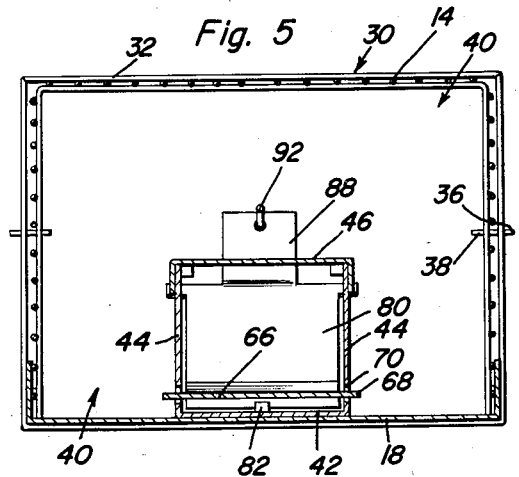
Figure 6:
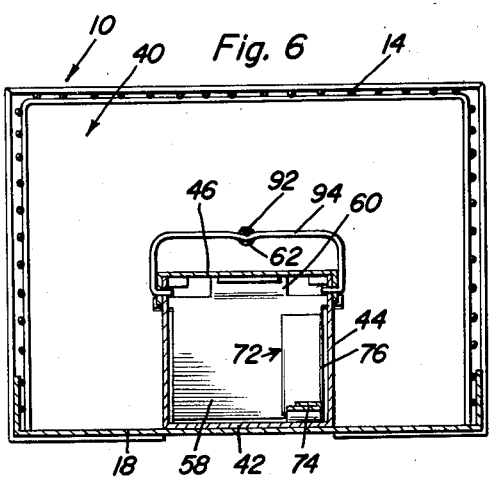
Figure 7:
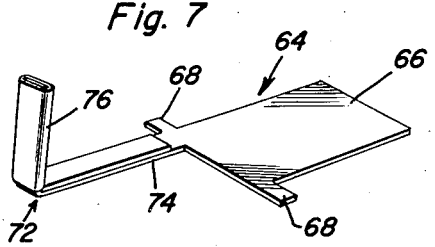

FIGURES 5 and 6 are sections on the transverse vertical lines 5—5 and 6—6 of FIGURE 2, respectively; and FIGURE 7 is a view in perspective of the platform by itself.

The cage, as a unit, is denoted by the numeral 10 and the complemental and companion chute by the numeral 12. The cage has a fabricated wire body including a top wall 14 and side walls 16. The bottom wall is preferably imperforate and may be constructed of sheet metal as at 18. The front vertical end wall is denoted at 20 and has a marginal flange (or flanges) 22 capped over the end portions of the cage walls 14, 16 and 18. Suitable wire clips or the like 24 are provided on the rim or flange and are hooked into the wires of the side walls to maintain this front wall in place. The front entrance opening at the center of the wall is denoted at 26. A flange 28 is struck out from the top portion of the opening and is directed laterally and outwardly and serves a purpose to be further described. The rear wall 30 is similar to the front wall in that it is made of sheet metal and has a marginal rim embodying flanges 32 which cap over the cooperating walls of the cage. A wire or an equivalent bail 34 is provided and has laterally directed forward ends 36 with bent in terminals 38 engaging in keeper holes and in this manner serving to hold the wall removably in place. By prying the bent ends 36 outwardly with a suitable tool and releasing the detents 38 this wall, as a unit, may be removed.

Figure 1:
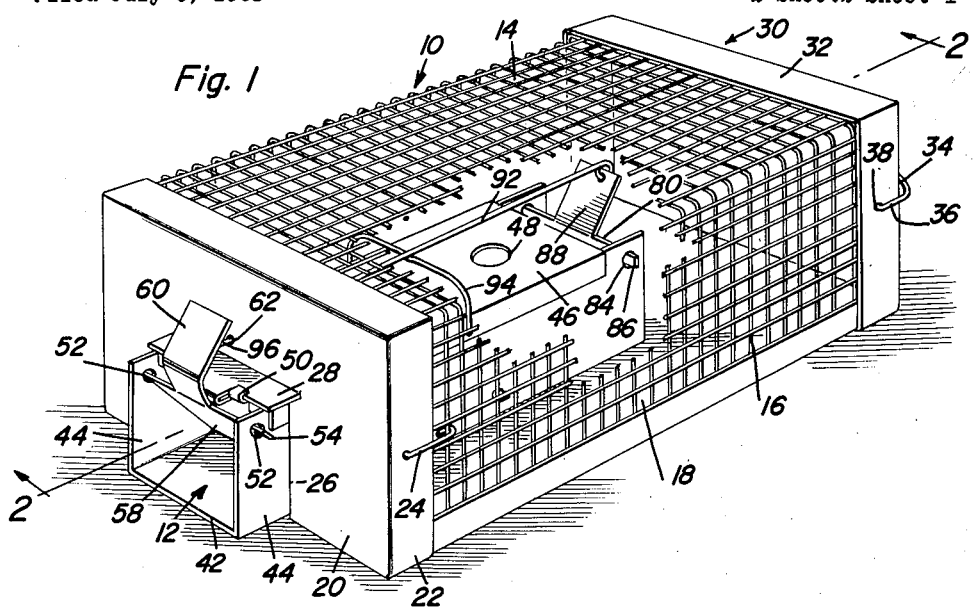
FIGURE 1 is a view in perspective of an animal trap constructed in accordance with the invention and with a portion broken away to show the inner end portion of the aforementioned chute.

The major portion of the tunnel-like chute 12 is housed or confined within the imprisoning space 40 of the cage. This unit 12 is of open-ended tubular form and is generally made of sheet material and is here shown as rectangular in cross-section and open ended. It embodies a bottom wall 42, side walls 44 and a suitably attached top wall 46. The top wall has an opening or hole 48 therein for a purpose to be described. The lefthand end portion of the top wall has attaching and retaining hooks 50 which are hooked over the edge of the forwardly projecting lip or flange 28 thus anchoring the chute in place. The upper portions of the side walls 44 which protrude through the opening 26 as shown in FIGURE 1 are provided with bearing holes 52 which serve to accommodate attaching and hinging members 54 on the upper marginal edge portions of the first trap door 58. This being the entrance end the door is identified as the entrance door and it will be noticed that it comprises a rectangular sheet metal or an equivalent panel which is gravity lowerable to closed position. The upper median portion has a laterally bent reset tongue or finger 60 which is lined up with a hole 62 provided in the front wall 20.

With reference now to the platform this is animal actuated and it is denoted as an entity by the numeral 64 in FIG. 7 and comprises a flat plate 66 having marginal outstanding lugs 68 constituting hinges and rockable in bearing holes 70 provided in the side walls of the chute. There is an L-shaped member constituting a trip 72 and this has a horizontal arm 74 and an upstanding arm 76 the latter being adapted to engage releasably between the cooperating edge 78 of the trap door set in the manner illustrated in FIGURE 3.

Taking up now the second animal responsive or pressure operated trap door this is similar to the front trap door but is referred to as the exit door and is denoted by the numeral 80. It comprises a plate the lower edge of which is engageable with stop shoulder 82, the upper portion being provided marginally with a pair of outstanding lugs 84 constituting pintles and said pintles being journaled for operation in the bearing holes as shown at 86 in FIG. 1. This door, similar to door 58, is provided on its upper portion with an extension or tongue 88 which is a reset tongue. It will be noted that the upper end of the tongue 88 is oblique angled and directed rearwardly, that is toward the right in FIGS. 2 and 3. This end is apertured to accommodate an attaching eye 90 on a longitudinally actuatable trigger wire or rod 92. A median portion of the rod 92 rides slidingly over a suitable horizontal guide and prop 94 carried by the median portion of the side walls of the chute. The free lefthand end of this rod extends through and beyond the aforementioned hole 62 in the front wall said end being denoted at 96 and obviously serving to engage the reset finger 60.

In operation and assuming that the trap is empty and the trapper desires to set the trap all that is necessary is for him to place a finger in the mouth of the tunnel of the chute and lift the door 58 up until the heavy weighted pivoted end made up of the L-shaped trip 72 drops into position with the upper end of the trip finger 76 now engaging beneath the trippable edge 78 of the entrance trap door. This is accomplished somewhat as shown in full and dotted lines in FIG. 2 and the initial or set position is that illustrated in FIG. 3. Now and assuming that the trap has been suitably baited it is set and ready to go. The enticed victim enters left to right through the entrance 12 and moves to a position on the platform 64. It will be noticed in this connection that the L-shaped trigger 72 is offset to the left of the lengthwise center of the tunnel so as to expedite entrance. As soon as the animal moves the tiltable righthand portion or plate 66 of the platform it goes down as depicted in FIG. 4 and the trip means 76 comes into play and allows the entrance door to gravitate automatically to closing position. Since the animal cannot now escape to the left he continues on into the imprisoning space by pushing the exit or trapdoor 80 from the position shown vertically in FIG. 3 to the tilted position shown in FIG. 4. As the door 80 is shoved in this manner it imparts a right to left movement to the reset trigger rod 92 which then engages the reset finger 60 in a seemingly obvious manner and once again the entrance door is set for the next victim.

There is a hole 48 in the top wall which permits one to insert a test wire or rod (not shown) or any equivalent instrument into the tunnel to test the readiness or operability of the platform. In other words by taking a rigid wire and passing it downwardly through the wire body of the cage and then down through the hole 48 and engaging the end with the uplifted plate or platform 66 as shown in FIG. 3 and pressing on the rod the platform can be tripped the same as would be done by the animal as shown in FIG. 4 thus enabling the user to make a test.

The trap may be made from suitable materials and made large or small depending on whether the animals to be trapped are relatively large or small.

It is believed that a careful consideration of the description in conjunction with the views of the drawings and the invention as claimed will enable the reader to obtain a clear and comprehensive understanding of the details of construction, their arrangement and cooperation, the mode of operation and the features and advantages of the invention. Under the circumstances a more extended description is believed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An animal trap which may be initially set by hand and which thereafter functions automatically until the user is again called upon to resort to the handsetting step comprising an outer cage having top, bottom and side walls, and front and rear end walls, said rear end wall being readily applicable and removable and permitting access to be had to the imprisoning space in the cage, said front end wall being likewise readily applicable and removable and provided with an entrance opening the lower margin of which is in a plane with the plane of said bottom wall, a door-equipped chute having a major portion in the space of the cage and having an end portion aligned and cooperable with the entrance opening in said front end wall, said chute comprising an open ended tube having top, bottom and side walls, a pivoted gravity lowered entrance door mounted in one, the entrance end, of said tube, a pivoted gravity lowered exit door mounted in the other, the exit end, of the tube, a pivoted plate in a median portion of the chute between the respective doors, said plate being counterbalanced in a counterclockwise direction and provided at one side thereof with an offset L-shaped trip, said trip having a vertical member positioned beneath and releasably engageable with a free cooperable edge portion of the entrance door, the upper portions of the respective doors being provided with upstanding fingers, said fingers being aligned with each other, a reset rod arranged exteriorly of and above the plane of the top wall of said tube and having one end hingedly connected with the finger of the exit door, said front wall having a rod opening, the adjacent end of said rod projecting outwardly through and beyond said opening and being engageable with the finger at the upper end of the entrance door.

2. For use in a trapping and storing cage, an open ended elongated tubular member constituting a chute and providing a tunnel-like passage for animals, said chute having top, bottom and side walls, an entrance end, and an exit end, a plate at the entrance end constituting a trap door and provided with pintles hingedly mounted in bearings provided therefor in upper portions of the side walls of said chute, the upper end of said door having a first reset finger projecting above the top wall of the chute, a second plate at the exit end of said tubular member and gravity lowerable and having hinge pintles journaled for operation in bearings provided therefor in adjacent portions of the side walls of the chute, said second plate constituting an exit door and having an upper end provided with an extension constituting a reset second finger, a projectible and retractible reset rod supported slidingly atop said tubular member and having one end linked to and pivotally connected with said second finger and having the opposite end free and cooperable and engageable with the first finger, a platform having a forward edge portion hingedly mounted between the side walls of said chute, said platform being situated in the median portion of the chute between the respective doors and being provided at its pivoted end with an L-shaped trip, said trip having a vertical member which is adapted to releasably engage a cooperating marginal edge portion of said trap door.

3. The structure defined in claim 2 and wherein the median upper portion of said tubular member is provided with an upstanding fixedly mounted prop constituting a guide, the median portion of said rod being supported slidingly atop said guide.

4. An animal trap which may be initially set by hand and which thereafter functions automatically until the user is again called upon to resort to the handsetting step comprising an outer cage having top, bottom and side walls, and front and rear end walls, said rear end wall being readily applicable and removable and permitting access to be had to the imprisoning space in the cage, said front end wall being likewise readily applicable and removable and provided with an entrance opening the lower margin of which is in a plane with the plane of said bottom wall, a door-equipped chute having a major portion in the space of the cage and having an end portion aligned and cooperable with the entrance opening in the front end wall, said chute comprising an open ended tube having top, bottom and side walls, a pivoted gravity lowered entrance door mounted in one, the entrance end, of said tube, a pivoted gravity lowered exit door mounted in the other, the exit end, of the tube, a pivoted plate in a median portion of the chute between the respective doors said plate being counterbalanced in a counterclockwise direction and provided at one side thereof with an offset L-shaped trip, said trip having a vertical member positioned beneath and releasably engageable with a free cooperable edge portion of the entrance door, said front wall having a guide opening in a plane above the entrance end of said tube the median upper pivoted end portion of said entrance door being located exteriorly of said front wall and being provided with an upwardly and rearwardly directed door pivoting reset finger, the upper median pivoted portion of said exit door being provided with a lateral finger projecting to a plane above the plane of the top wall of said tube, an elongated rigid reset rod positioned exteriorly of and above the plane of the top wall of said tube and having one end thereof hingedly connected with the finger provided on said exit door, the other end of said rod being free and projecting slidingly through and outwardly beyond the guide opening provided therefor in said front wall and being in line with and adapted to cooperatively engage the reset finger which is provided therefor on said entrance door.

References Cited in the file of this patent

UNITED STATES PATENTS

| | | |
|---|---|---|
| 138,275 | Owen | Apr. 29, 1873 |
| 1,978,995 | Fuller | Oct. 30, 1934 |